United States Patent [19]

Kuban

[11] Patent Number: 5,265,990
[45] Date of Patent: Nov. 30, 1993

[54] SHORT TOOLHOLDER SYSTEM

[75] Inventor: William Kuban, Columbia Heights, Minn.

[73] Assignee: Kurt Manufacturing Company, Inc., Minneapolis, Minn.

[21] Appl. No.: 996,108

[22] Filed: Dec. 23, 1992

[51] Int. Cl.⁵ .............................................. B23Q 3/12
[52] U.S. Cl. ................................. 409/232; 279/133; 279/145; 409/230
[58] Field of Search ............ 409/230, 231, 232, 233, 409/234; 279/83, 133, 145

[56] References Cited

U.S. PATENT DOCUMENTS

| | | | |
|---|---|---|---|
| 2,940,367 | 6/1960 | Cogsdill | 90/12 |
| 3,136,217 | 6/1964 | Swanson et al | 409/232 |
| 4,135,848 | 1/1979 | Hughes et al. | 408/239 |
| 4,238,167 | 12/1980 | Brugger et al. | 409/232 |
| 4,303,360 | 12/1981 | Cayen et al. | 409/233 |
| 4,902,177 | 2/1990 | Burnett | 409/234 |

FOREIGN PATENT DOCUMENTS 16976 2/1978 Japan ..................... 409/233

Primary Examiner—Daniel W. Howell
Attorney, Agent, or Firm—Kinney & Lange

[57] ABSTRACT

In a milling machine or the like having a socket for a removable arbor having, a frictional engaging member is positioned around the removable arbor such that the frictional engaging member is positioned between the removable arbor and the spindle when the arbor is inserted into the spindle. A flange is positioned below the clamping member on the removable arbor to limit the downward motion of the clamping member and to communicate with the spindle to limit the inward placement of the arbor within the spindle. A sleeve connects the arbor to a drawbar and a drive collar engages the arbor with the spindle for rotation.

21 Claims, 3 Drawing Sheets

SHORT TOOLHOLDER SYSTEM

BACKGROUND OF THE INVENTION

The present invention relates, in general, to toolholder systems for machine tools and the like and, more particularly, to a removable tool holding arbor clamped into a socket in the spindle by axial motion of a drawbar.

Removable arbors or toolholders are known for drill presses, milling machines and the like. A typical arbor has a cylindrical shank which mounts into a corresponding socket in the spindle, a central bore therethrough for holding a tool, and a threaded inner end engaged by a drawbar. Tools are typically exchanged in the machine by removing one arbor and replacing it with another in which a different tool is mounted.

Removable arbors are particularly useful in milling and drilling machines such as a Bridgeport milling machine (Bridgeport is a registered trademark of the Bridgeport Machines, Inc.). In such machines, the spindle has an axial bore which opens into an arbor socket, and a drawbar rotatably mounted within the bore. The drawbar has a threaded outer end engaging the threaded inner end of the shank of the tool holding arbor. Rotating the drawbar, either manually or by a drawbar motor, acts to tighten the threaded sections between the drawbar and the arbor, and draws the arbor up into the socket. To release the arbor, the drawbar is rotated in the opposite direction to unscrew the threaded sections from each other.

The outer end of the socket and the outer end of the arbor are flared outward so that the two surfaces engage as the arbor is drawn into the socket. However, the contact surface is not accurate among different arbors to limit exactly how far up the socket the arbor is drawn, especially if the arbors are of different sizes. Varying the placement of different arbors within the socket leads to errors in the finished workpiece.

Also, typical arbors include a relatively long shank which extends almost entirely into the socket for radially locating the arbor, for securing the arbor in the socket, and for receiving and engaging a tool. Replacement of arbors having long shanks requires substantial clearance between the tool or arbor and the workpiece being machined. Removal of the workpiece to replace an arbor is undesirable as it leads to machining errors when the work piece is replaced. As there is a direct relationship between the length of the shank of the arbor and the amount of clearance needed to remove the arbor from the spindle, it is desirable to have an arbor with a short shank.

SUMMARY OF THE INVENTION

The present invention is a toolholder system which has a short length to aid in replacement of tools without moving the workpiece. A removable tool holding arbor has a central longitudinal tool receiving bore, a first coupling mechanism at one end for coupling the arbor to a drawbar assembly, and an annular flange around the bore opening which contacts an outer surface of the spindle to limit inward movement of the arbor and repeatably position the arbor as it is drawn into the socket. The arbor also employs a ferrule or collar like clamping member positioned around the arbor between the first coupling mechanism and the flange. The clamping member is movable along a central longitudinal axis of the arbor such that as increasing frictional force is created between the spindle and the arbor as the arbor is drawn into the socket, and radially compressible such that the clamping member clamps to the shank of the arbor as the arbor is drawn into the socket. The arbor is of a substantially shorter length than previous arbors.

In the preferred embodiment a two piece drive collar clamps around the spindle and engages the flange for driving the arbor. Also, a sleeve connects the arbor to the drawbar and has an inner bore of substantially the same diameter as the arbor bore for receiving a tool therein.

DETAILED DESCRIPTION OF THE PREFERRED EMBODIMENTS

Figure 1:
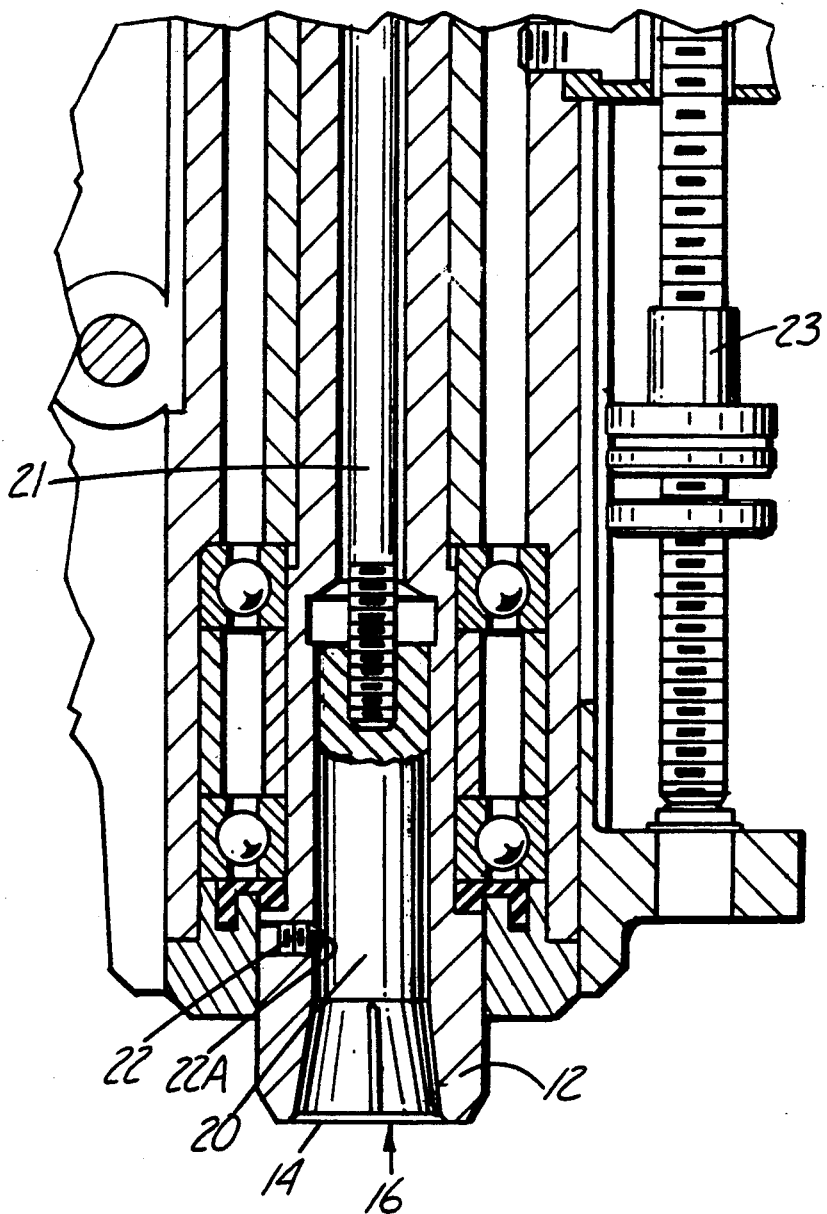
FIG. 1 is a vertical sectional view through the toolholder system and a portion of a Bridgeport milling machine of the type known in the art.

FIG. 1 depicts a typical prior art Bridgeport milling machine having a rotatable spindle 12 with a central bore 14 therethrough which opens into a socket 16. An arbor 20 is mounted within the socket 16 and tightened in place using a drawbar 21. A set screw 22 fits into a longitudinal groove 22A on the arbor 20 to radially align the arbor within the spindle 12 so that arbor 20 does not rotate as it is being drawn into the socket 16 by the drawbar. A tool depth control mechanism 23 controls how far the spindle 12 may be extended and hence controls the machining depth on a workpiece (not shown).

In a typical Bridgeport machine the tool holding arbor 20 and the corresponding socket 16 are approximately 5 inches in length. Thus, on a vertical spindle the clearance needed between the spindle 12 and the workpiece must be at least the height of the arbor plus the height of the tool or else the workpiece will have to be lowered in order to obtain the clearance to replace one arbor with another.

Figure 2:
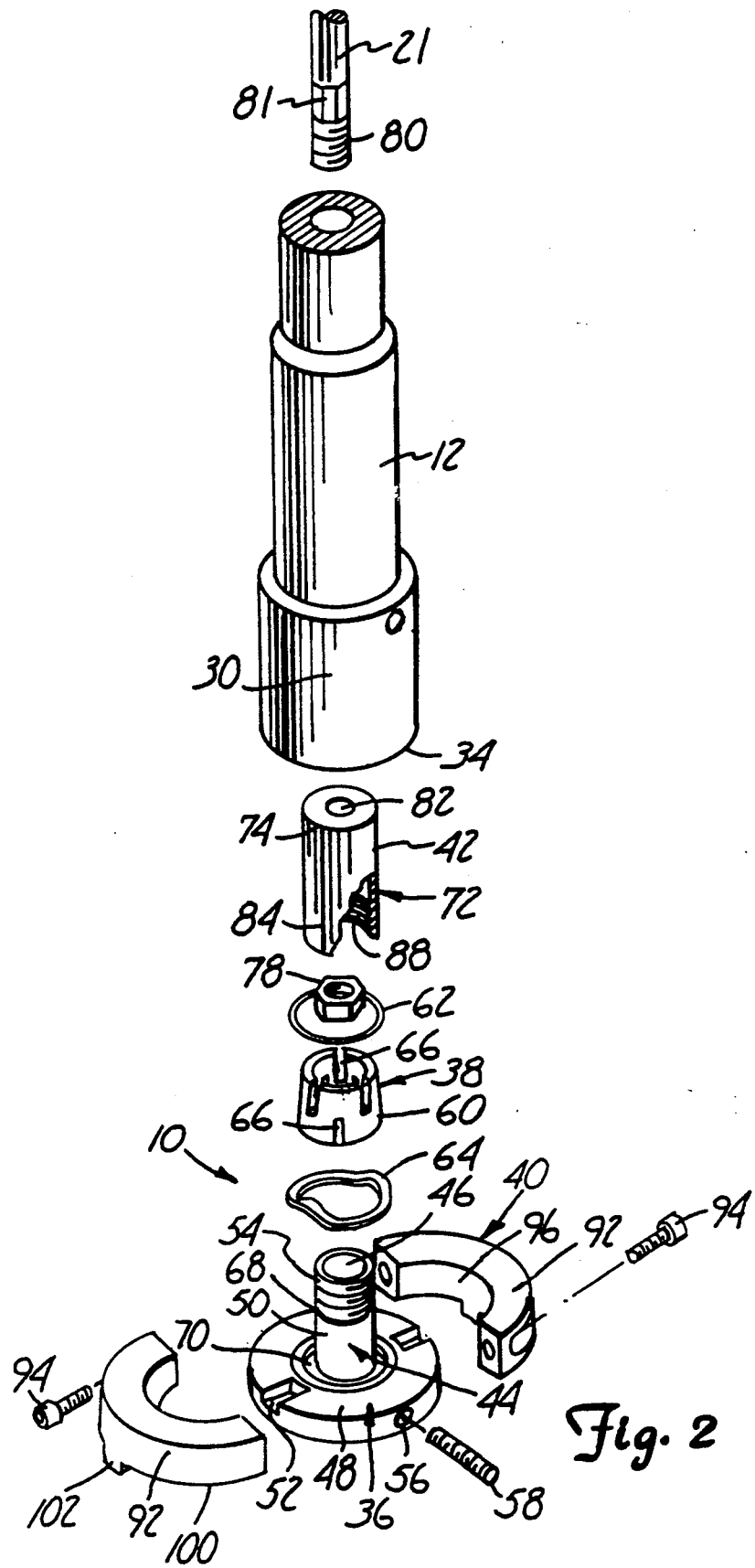
FIG. 2 is a perspective view of the toolholder system without the milling machine.
Figure 3:
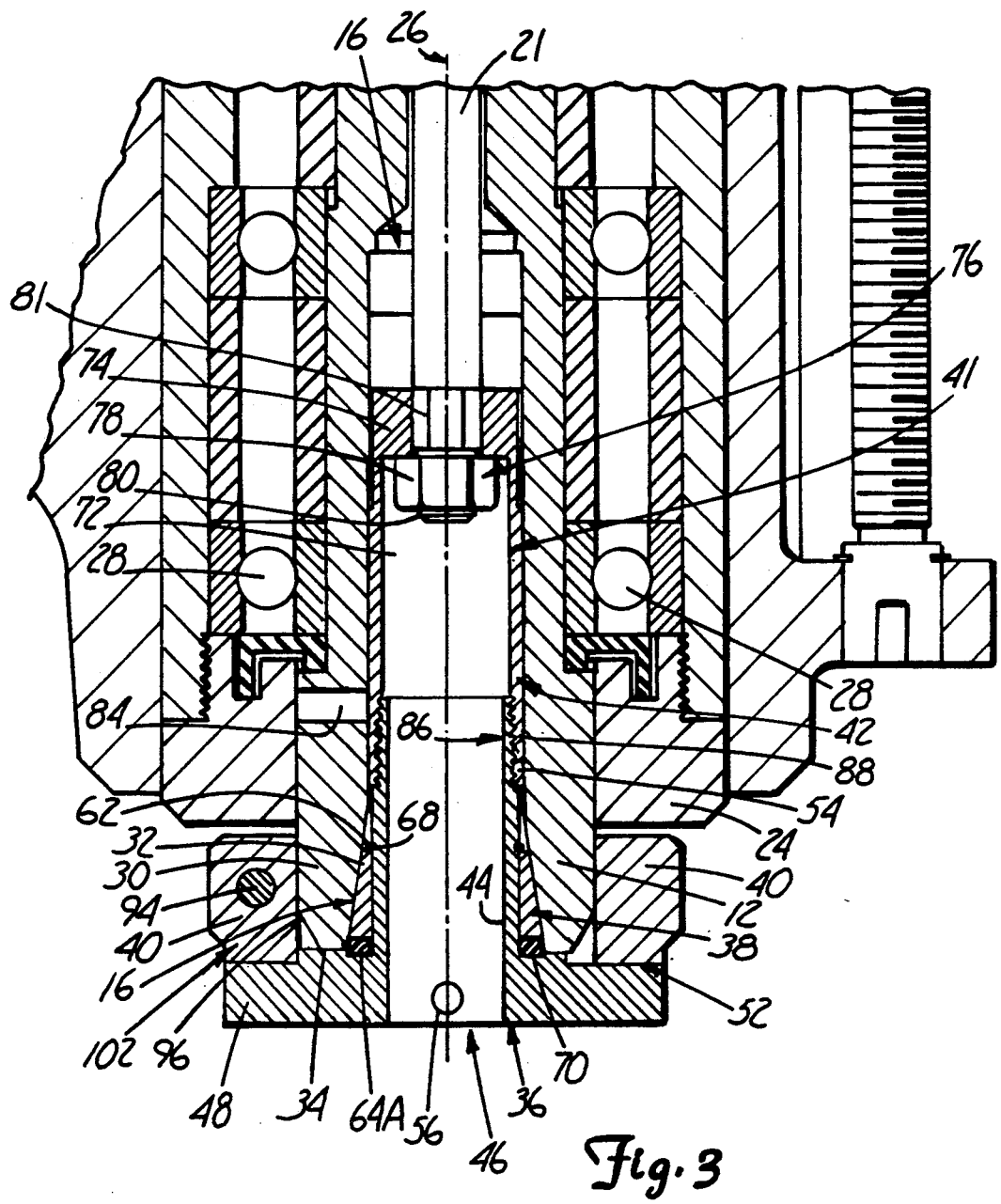
FIG. 3 is a vertical sectional view through a portion of a milling machine of FIG. 1 having a toolholder system employing the teachings of the present invention.

Referring to FIG. 2 in particular, there is disclosed a preferred embodiment of the present invention. The invention is a short toolholder system generally designated at 10, for milling machines, drill presses, and the like. The short toolholder system 10 is designed to replace the arbor 20 of the prior art and to be mounted within the same spindle 12. FIG. 3 illustrates the relevant part of the housing, generally designated 24, of a Bridgeport milling machine as seen in FIG. 1. Construction of the Bridgeport milling machine is well known in the art.

Referring to FIG. 3, the housing 24 of the milling machine is fixed about a longitudinal axis 26. The drive spindle 12 is positioned within the housing 24 such that the spindle 12 rotates about the longitudinal axis 26. Based on having a vertical spindle, the spindle 12 reciprocates from a raised position where the spindle 12 is substantially within the housing 24 to a lowered position where the spindle 12 protrudes from the housing 24 to enable milling, drilling, or other tooling activity. A suitable bearing arrangement 28 permits rotation of the spindle 12 about the longitudinal axis 26.

An outer end 30 of the spindle 12 opens into the socket 16 and extends beyond the housing 24 when the spindle 12 is in the raised position. The outer end 30 of the spindle 12 is tapered outward at 32 to form a contact surface for engaging the arbor assembly 10, to facilitate quick and easy insertion of the arbor assembly 10 into the spindle 12, and to form a lip or stop surface 34.

Generally, the toolholder system 10 includes a tool holding arbor 36, a clamp assembly 38, and draw means 41 which couples between the arbor and drawbar.

The arbor 36, also known generally as a toolholder, is substantially different from other arbors known in the art and as seen in FIG. 1. As mentioned above, FIG. 1 shows a typical arbor 20 having a long shank, approximately five inches in height, which fills substantially the entire socket 16, and a guide screw 22A to control the positioning of the arbor 20 within the socket 16. In contrast, the arbor 36 of the present invention is less than one-half the height of the socket. In a Bridgeport milling machine, the arbor would be approximately two inches in height and thus have a substantially shorter shank 44 than the arbor 20 of FIG. 1. The shank 44 is a cylindrical tube, and has a central longitudinal bore 46 therethrough. The shank 44 can extend slightly beyond the tapered surface 32 of the spindle to prevent flaring of the draw means 41 under fault conditions.

An annular flange 48 extends radially outward from an exterior surface 50 of the arbor 36. The flange 48 has a diameter sufficient to engage the stop surface 34 of the spindle 12 when the arbor 36 is inserted into the socket 16 to limit inward movement of the arbor 36 when drawn into the spindle 12 and to increase the rigidity of the arbor 36 within the spindle 12. In the illustrated embodiment, the diameter of the flange 48 is sufficient to extend past the spindle 12 to support a recess 52 or other coupling means to engage a drive collar 40. Frictional forces between the flange 48 and the spindle 12 also serve to transfer rotational drive forces of the spindle 12 to the arbor 36.

A threaded section 54 is located on the exterior surface 50 of the arbor 36 for coupling the arbor 36 to a sleeve 42 of the draw means 41. Other coupling means can be used for this purpose, but by threading the exterior surface 50 of the arbor 36, it avoids forming a flange between the sleeve 42 and the arbor 36 which would interfere with insertion of a tool in the arbor bore 46.

The arbor 36 has an opening 56 running through the flange 48. The opening 56 is generally perpendicular to the longitudinal axis 26 of the housing 24 and receives a set screw 58 to fasten a tool (not shown) within the arbor bore 46 for driving the tool with the spindle 12 and arbor 36.

A tool is received into the bore 46 and, depending on the length of the tool, extends through the bore 46 into the sleeve 42. The sleeve 42 thereby acts to accommodate long tools which were used with arbors known in the prior art and as shown in FIG. 1. As mentioned above, threading the exterior surface 50 of the arbor 36 makes this possible.

The clamp assembly 38 includes a collet collar 60, a retaining ring 62, and a wave spring 64. The clamp assembly 38 is positioned around the arbor 36 between the threaded section 54 and the flange 48. The clamp assembly both clamps to the shank 44 of the arbor and frictionally engages itself to the surface of the socket 16.

The collet collar 60 is tapered inward towards the threaded section 54 of the arbor 36 such that it can be wedged and centered between the outwardly tapered surface 32 of the spindle 12 and the arbor 36. The collet collar 60 is moveable a limited distance along the longitudinal axis 26 of the housing 24 such that as the arbor 36 is drawn up into the spindle socket 16 an increasing frictional force is created between the collet collar 60 and the surface of the socket 16 and the arbor 36 is centered within the socket 16 along the longitudinal axis 26 of the housing 24. The collet collar 60 also includes at least one longitudinal slot 66 therein, so that as the collet collar 60 is drawn up into the socket 16 it can compress radially for a tighter clamping fit around the shank 44. In one embodiment, there are six slots 66. Three of the slots 66 open at a inner end of the collet collar 60 near the threaded section 54 of the arbor 36 and are alternated around the circumference of the collet collar 60 with three slots 66 which open at a outer end of the collet collar 60 near the flange 48.

The retaining ring 62 or other retaining member is positioned between the collet collar 60 and the threaded section 54 in an annular groove 68 around the shank 44 to limit inward movement of the collet collar 60.

The wave spring 64 (as shown in FIG. 2) or other compressible urging member such as a rubber O-ring 64A (as shown in FIG. 3) is placed in an annular grove 70 between the collet collar 60 and flange 48. As the arbor 36 is drawn into the socket 16, the wave spring 64 produces an upward force on the collet collar 60 allowing the collet collar 60 to move along the longitudinal axis 26 until the flange 48 of the arbor engages the stop surface 34 of the spindle. The axial forces developed by the wave spring 64 are sufficiently high to maintain the friction fit of the collet collar 60 under machining conditions.

A drive collar 40 is positioned around the external surface of the spindle 12 adjacent the flange 48 of the arbor 36 for transferring drive from the spindle 12 to the arbor 36. The drive collar 40 is formed by a pair of clamp members 92 which attach to each other at facing ends by screw means 94. An interior surface 96 formed by both clamp members 92 frictionally clamps to the exterior surface of the spindle 12 as the screw means 94 is tightened. The frictional force created between the spindle 12 and the drive collar 40 is sufficient to transfer needed loads under machining conditions. Coupling means is positioned on an outer surface 100 of at least one, but preferably both clamp members 92 for coupling the drive collar 40 to the flange 48 of the arbor 36. The coupling means includes a key tab 102 protruding from the outer surface 100 of the clamp member 92 and the corresponding recess 52 in the inner surface of the flange 48. In the illustrated embodiment, the length of the key tab 102 and the depth of the recess 52 are such that the key tab 102 engages the recess 52 to radially align and prevent undesired rotation of the arbor 36 as the draw means 41 draws the arbor 36 into the socket 16.

The draw means includes sleeve 42 and the drawbar 21. The sleeve 42 has a central bore 72 therethrough of substantially the same diameter as the arbor bore 46 so as to receive long tools which extend beyond the arbor bore 46. An inner end 74 of the sleeve 42 engages the drawbar 21 by coupling means 76 which is shown to be a member 78 positioned within the bore 72 and threaded on a threaded portion 80 of the drawbar 21. The drawbar 21 has a hexagonal cross-section 81 or other non-circular cross-section, which is extended into and engages a corresponding opening 82 in the inner end 74 of the sleeve 42 to insure simultaneous rotation of the sleeve 42 with the drawbar 21. The nut 78 is larger than the opening 82 and secures the drawbar 21 to the sleeve 42. An outer end 84 of the sleeve 42 has a threaded section 88 to engage the threads 54 on the arbor 36. Preferably, threaded section 88 is on an interior surface of the sleeve 42 which mates with the exterior threaded section 54 of the arbor 36. As mentioned above, this particular orientation of the threaded sections avoids formation of a lip or flange at the thread overlap which can interfere with insertion of a tool in the sleeve bore 72.

The drawbar 21 is coupled at one end to the sleeve 42 by coupling means 76 and at the other end to an air impact wrench (not shown) or other means well known in the art for rotating the drawbar 21 and drawing the toolholder system 10 up into the spindle 12. As the wrench tightens the drawbar 21, the arbor 36 is drawn up the threaded section 88 of the sleeve 42 until the stop surface 34 engages the flange 48. As drawbar 21 is loosened, the arbor 36 is extended down the threaded section 88 of the sleeve 42 until the arbor 36 disengages the spindle 12 and sleeve 42 so that the arbor 36 can be removed and replaced with another arbor.

In operation, it is desirable to quickly replace the arbor 36 of a milling machine with other arbors so that various tools may be used with the machine. To remove the arbor 36 from the spindle 12 the drawbar 21 is loosened. The key tab 102 on the drive collar 40 remains in contact with the recess 52 on the flange 48 such that the arbor 36 does not rotate while the drawbar 21 is loosened. As the drawbar 21 continues to rotate the frictional forces between the collet collar 60 and the socket 16 and clamping forces between the collet collar 60 and the shank 44 are reduced so that the arbor 36 can be withdrawn from the spindle 12 easily and with less clearance along the axial direction than would be required with longer arbors. By keeping the sleeve 42 within the spindle 12, arbors are quickly and easily replaced with each other with substantially less clearance than is required with arbor such as in FIG. 1.

To insert the arbor 36 into the machine, the drive collar 40 is first positioned around the spindle 12. The arbor 36, with the clamp assembly 38 positioned around the shank 44, is then positioned within the spindle 12 so that the threaded sections 54 and 88 extend beyond the tapered section 32 of the socket 16 to prevent undesired flaring of the sleeve 42. In addition, the key tab 102 engages the recess 52 so that the arbor 76 does not rotate as the drawbar 21 is tightened. The threaded sections 54 and 88 tighten drawing the arbor 36 inward and causing the collet collar 60 to contact the tapered section 32 of the socket 16. The collet collar 60 radially compresses so as to clamp itself to the shank 44. The wave spring 64 maintains the collet collar in frictional engagement with the tapered section 32 of the socket 16. The drawbar 21 continues to tighten until the stop surface 34 engages the flange 48 to assure consistent placement of the arbor 36 within the socket 16. The collet collar 60 also serves to center the arbor 36 along the longitudinal axis 26 of the housing 24.

In summary, the present invention provides a tool holding arbor of substantially shorter height than known arbors. The shorter arbor contributes to improved machining of a workpiece since the workpiece is less likely to be moved to accommodate a new machining tool.

Although the present invention has been described with reference to preferred embodiments, workers skilled in the art will recognize that changes may be made in form and detail without departing from the spirit and scope of the invention.

What is claimed is:

1. A toolholder assembly for insertion into a socket in a spindle of a tooling machine, the toolholder assembly comprising:

draw means for drawing the toolholder assembly into the socket;

an arbor having a central longitudinal bore therethrough having a bore opening for receiving a tool therein, first coupling means at an end opposite the bore opening for coupling the arbor to the draw means, an annular flange around the bore opening having a diameter sufficient to contact an outer surface of the spindle to limit inward movement of the arbor when drawn into the spindle; and a clamping member positioned around the arbor between the first coupling means and the flange which frictionally engages the spindle as the arbor is drawn into the socket by draw means which moves independent of the arbor to permit the arbor to be drawn into the socket after the clamping member engages the spindle, and which centers the arbor within the socket as the arbor is drawn into the socket.

2. The toolholder assembly of claim 1, wherein the clamping member is a collet collar having an outer wall which tapers inward toward the first coupling means, the spindle having an inner wall which tapers outward to receive the arbor.

3. The toolholder assembly of claim 2, wherein the collet collar can be compressed radially as the arbor is drawn into the socket to clamp the arbor.

4. The toolholder assembly of claim 3, wherein the collet collar has at least one longitudinal slot open at a inner end of the collet collar and at least one slot open at a outer end of the collet collar.

5. The toolholder assembly of claim 3, further comprising an urging member for urging the collet collar inward into frictional engagement with a socket surface as the arbor is drawn into the spindle, the urging member being positioned around the arbor between the collet collar and the flange.

6. The toolholder assembly of claim 5, further comprising a retaining member for retaining the collet collar on the arbor and for limiting the relative longitudinal movement of the collet collar, the retaining member being positioned around the arbor between the first coupling means and the collet collar.

7. The toolholder assembly of claim 5, wherein the urging member is a wave spring.

8. The toolholder assembly of claim 5, wherein the urging member is a compressible O-ring.

9. The toolholder assembly of claim 1, wherein the draw means includes a drawbar, and a sleeve having a central bore therethrough of substantially the same diameter as the arbor bore, second coupling means at one end of the sleeve for coupling the sleeve to the drawbar, and where the first coupling means couples to an opposite end of the sleeve for coupling the sleeve to the arbor.

10. The toolholder assembly of claim 9, wherein the first coupling means comprises a threaded section located on an exterior surface of the arbor, and a threaded section located on an interior surface of the sleeve within the sleeve bore, the threaded sections threadably mating with each other.

11. The toolholder assembly of claim 9, wherein the threaded sections mate with each other such that the sleeve does not extend into an outwardly tapered portion of the socket at an outer end of the spindle.

12. The toolholder assembly of claim 1, further comprising means for transferring rotational drive of the spindle to the arbor.

13. The toolholder assembly of claim 12 wherein the means for transferring is a drive collar positioned around an external surface of the spindle of the tooling machine, such that the drive collar engages the flange of the arbor for transferring drive from the spindle to the arbor.

14. The arbor assembly of claim 13, wherein the collar is formed by a pair of clamp members which are attached to each other by attaching means and frictionally attached to the spindle by tightening the attaching means, wherein at least one of the clamp members has a third coupling means thereon for coupling the collar to the flange.

15. A removable tool holding arbor assembly for use with a tooling machine having a drawbar which extends into a spindle for engaging the arbor assembly, the spindle having a central longitudinal bore forming a socket for receiving the arbour assembly, the socket having an outwardly tapered surface at an outer end thereof which forms an outer lip, the arbor assembly comprising:

an arbor having a central longitudinal bore therethrough open at an outer end for receiving a tool and open at an inner end for permitting the tool to extend into the socket when the arbor is positioned in the spindle, and first coupling means at an inner end of the bore for coupling the arbor to a sleeve, the sleeve having a central bore therethrough of substantially the same diameter as the arbor bore for receiving the tool, and second coupling means at an end of the sleeve opposite the first coupling means for coupling the sleeve to the drawbar, wherein the height of the arbor is substantially less than the height of the socket.

16. The removable arbor of claim 15, wherein the first coupling means is a threaded section on an exterior surface of the arbor which is engagable with a threaded section on the interior surface forming the bore in the sleeve.

17. The removable arbor assembly of claim 16, further comprising an annular flange around an exterior surface of the outer end of the arbor, the flange having a diameter sufficient to contact the outer lip of the spindle to limit inward movement of the arbor when drawn into the spindle.

18. The removable arbor assembly of claim 17, further comprising a clamping member positioned around the arbor between the first coupling means and the flange which frictionally engages the spindle as the arbor is drawn into the socket, which moves independent of the arbor to permit the arbor to be drawn into the socket after the clamping member engages the spindle, which can be radially compressed as the arbor is drawn into the socket to clamp the arbor, and which centers the arbor within the socket as the arbor is drawn into the socket.

19. The removable arbor of claim 18, wherein the arbor is at least less than one half of the height of the socket.

20. The arbor assembly of claim 18, further comprising a drive transfer member for transferring drive from the spindle to the arbor.

21. The arbor assembly of claim 20, wherein the drive transfer member is formed by a pair of clamp members which attach to each other by screw means and to an external surface of the spindle adjacent to the flange by friction created by tightening the screw means, wherein at least one clamp member has a fourth coupling means thereon for coupling the drive transfer member to the flange.

* * * * *

UNITED STATES PATENT AND TRADEMARK OFFICE
CERTIFICATE OF CORRECTION

PATENT NO. : 5,265,990
DATED : November 30, 1993
INVENTOR(S) : William Kuban

It is certified that error appears in the above-indentified patent and that said Letters Patent is hereby corrected as shown below:

Column 7, line 25, cancel "arbour" and
         insert --arbor--.

Signed and Sealed this

Seventeenth Day of May, 1994

BRUCE LEHMAN

*Attest:*

*Attesting Officer*          *Commissioner of Patents and Trademarks*